(12) United States Patent
Pashnik et al.

(10) Patent No.: US 7,307,363 B2
(45) Date of Patent: Dec. 11, 2007

(54) STATOR COOLING SYSTEM FOR A HYBRID TRANSMISSION

(75) Inventors: Richard A. Pashnik, Saline, MI (US); Henryk Sowul, Oxford, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 191 days.

(21) Appl. No.: 11/232,761

(22) Filed: Sep. 22, 2005

(65) Prior Publication Data

US 2007/0063592 A1 Mar. 22, 2007

(51) Int. Cl.
*H02K 9/00* (2006.01)

(52) U.S. Cl. .......................................... 310/54; 310/52

(58) Field of Classification Search ............ 310/52–59, 310/254; 180/65.6–65.7
See application file for complete search history.

(56) References Cited

U.S. PATENT DOCUMENTS

| | | | | |
|---|---|---|---|---|
| 4,958,095 A | * | 9/1990 | Uchida et al. ................ 310/59 |
| 5,372,213 A | * | 12/1994 | Hasebe et al. .............. 180/65.6 |
| 5,632,157 A | * | 5/1997 | Sekino et al. .................. 62/244 |
| 6,320,287 B1 | * | 11/2001 | Watson et al. ................. 310/51 |
| 6,373,155 B1 | * | 4/2002 | Shimizu et al. ........... 310/68 B |
| 6,579,202 B2 | | 6/2003 | El-Antably et al. .......... 475/159 |
| 2005/0206251 A1 | * | 9/2005 | Foster .......................... 310/59 |
| 2006/0043801 A1 | * | 3/2006 | Adra ............................ 310/54 |
| 2006/0232146 A1 | * | 10/2006 | Bald ............................ 310/52 |

* cited by examiner

*Primary Examiner*—Thanh Lam

(57) ABSTRACT

A cooling system for an annular stator housed within a transmission casing includes a first curved tube sufficiently sized to at least partially circumscribe the stator when the tube is placed within the casing. The first tube has a plurality of circumferentially spaced fluid openings. An intake conduit connects the first tube to the transmission casing to deliver fluid through the tube for flow through the fluid openings to cool the stator. Preferably, a second like curved tube is also provided and a connector tube connects the first and second tubes to allow fluid flow therebetween. A method of assembling a cooling system is also provided.

19 Claims, 4 Drawing Sheets

STATOR COOLING SYSTEM FOR A HYBRID TRANSMISSION

TECHNICAL FIELD

This invention relates to a cooling system for a stator of a motor/generator in a hybrid electro-mechanical transmission and a method of assembling such a cooling system.

BACKGROUND OF THE INVENTION

A hybrid electro-mechanical vehicular transmission utilizes interactive differential gear arrangements that are operatively connected to an engine and typically two motor/generators. Selective utilization of torque transfer devices enables power transfer via the differential gear arrangements from the engine and/or motor/generators to the output member of the transmission.

A power transmission in an electro-mechanical transmission is described in commonly owned U.S. Provisional Application No. 60/590,427 entitled Electrically Variable Transmission with Selective Fixed Ratio Operation, filed Jul. 22, 2004, and hereby incorporated by reference in its entirety.

Hybrid system motor/generators, especially those for strong hybrid systems, must be high powered. Because limited packaging space is available within the transmission structure, the motor/generators require very high power density. High power density motor/generators produce a large amount of heat during operation. The stator of the motor/generator, with its high density electrical windings particularly produces a large amount of heat resulting in the need to control the temperature of the stator to ensure continuous and stable operation.

SUMMARY OF THE INVENTION

A stator cooling system that requires a minimum of added assembly steps, additional components, and minimal or no increase in pump capacity is desirable. Accordingly, a stator cooling system is provided to permit efficient cooling of a motor/generator stator. A cooling system for an annular stator housed within a transmission casing includes a first curved tube sufficiently sized to at least partially circumscribe the stator when the tube is placed within the transmission casing. The tube may form a complete circle or an arc or other curved portion not completely circumscribing the stator. The tube has a plurality of circumferentially-spaced fluid openings. An intake conduit is connected to the tube and delivers cooling fluid from within the transmission casing through the tube for flow through the fluid openings to cool the stator. Because the tube at least partially circumscribes the stator, the fluid is well-distributed around the stator by the fluid openings.

A second curved tube also sufficiently sized to at least partially circumscribe the stator and also having a plurality of circumferentially spaced fluid openings may also be included in the stator cooling system. A connector tube is connected to the first tube and extends between the first and second tubes to establish fluid connection therebetween. The first and second tubes are axially spaced from each other when connected by the connector tube. The fluid openings in the second tube deliver cooling fluid provided through the connector tube to the stator for further cooling thereof.

At least one of the first and second tubes preferably has fastening brackets each of which has a fastener opening that receives a fastener to secure the tube to the transmission casing. The fastening bracket may also have a locator opening for properly aligning the fastener bracket with the transmission casing via a locator such as a dowel pin. In some embodiments, both the first and second tubes have fastening brackets with fastener openings and are secured to the transmission casing at separate sets of bosses (i.e., sets of bosses located at different axial planes) via fasteners through the fastening brackets (i.e., the first tube is secured to a first set of bosses located generally adjacent the first tube and the second tube is secured to a second set of bosses axially-spaced from the first set of bosses and located generally adjacent the second tube). In other embodiments, an annular stator housing is provided which enables the entire cooling system to be secured to transmission casing bosses generally in one axial plane (i.e., one set of bosses). (A set of bosses is a group of casing extensions located generally at one axial plane).

In some embodiments, the stator is supported by an annular stator housing that circumscribes the stator. The annular stator housing is positioned between the first and second tubes when assembled therewith. The stator housing has a stator housing bracket with an assembly pin opening. The stator housing preferably has a stator housing bracket with an assembly pin opening. In these embodiments, the tube fastening bracket also has an assembly pin opening so that the stator housing bracket and the fastening bracket may receive an assembly pin through the respective pin openings to preassemble the stator housing and the tube prior to insertion into the transmission casing.

In some embodiments, one or more elongated braces are provided that are pretensioned to secure the second tube to the first tube. Optionally, the elongated braces may be secured (e.g., welded) to the first tube and extend generally axially therefrom for operative connection to the second tube.

In other embodiments, rather than being pretensioned in order to connect the first and second tubes via spring action, the elongated braces have a brace bracket with a fastener opening that may be aligned with a stator housing bracket on the stator housing to receive a fastener to thereby secure the first and second tubes as well as the stator housing to the transmission casing at a single boss.

Especially in embodiments which may be connected to the transmission casing at a single set of bosses, an efficient method of assembling the cooling system is achievable. The method includes providing first and second curved tubes, and aligning the second curved tube substantially concentrically with the stator housing at one side of the stator housing. The method also includes aligning the first curved tube substantially concentrically with the stator housing at an opposing side thereof to thereby establish fluid connection between the first and second arced tubes. Preferably, this fluid connection is established through the connector tube described above. The method then includes fastening the aligned tubes and stator housing to the transmission casing. As described above, in some embodiments the second curved tube has a fastener bracket with fastener openings. In these embodiments, aligning the second curved tube includes aligning the fastener openings in respective brackets of the second curved tube and the stator housing. In embodiments in which the elongated brace includes a fastener bracket, aligning the first curved tube includes aligning fastener openings in the bracket of the first curved tube with the previously aligned fastener openings of the second curved tube and the stator housing. Alternatively, in embodiments in which the elongated brace is pretensioned to secure the second tube to the first tube, aligning the first curved tube includes securing the first curved tube to the second curved tube, i.e., via spring tension in the elongated brace.

By providing a first curved tube (and preferably a second curved tube) which circumscribes or at least partially circumscribes the stator, efficient cooling of the stator is achieved. An assembly method ensures proper alignment of components and lessens dimensional tolerance stack up between components, thereby minimizing necessary packaging space and the need to increase transmission size.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
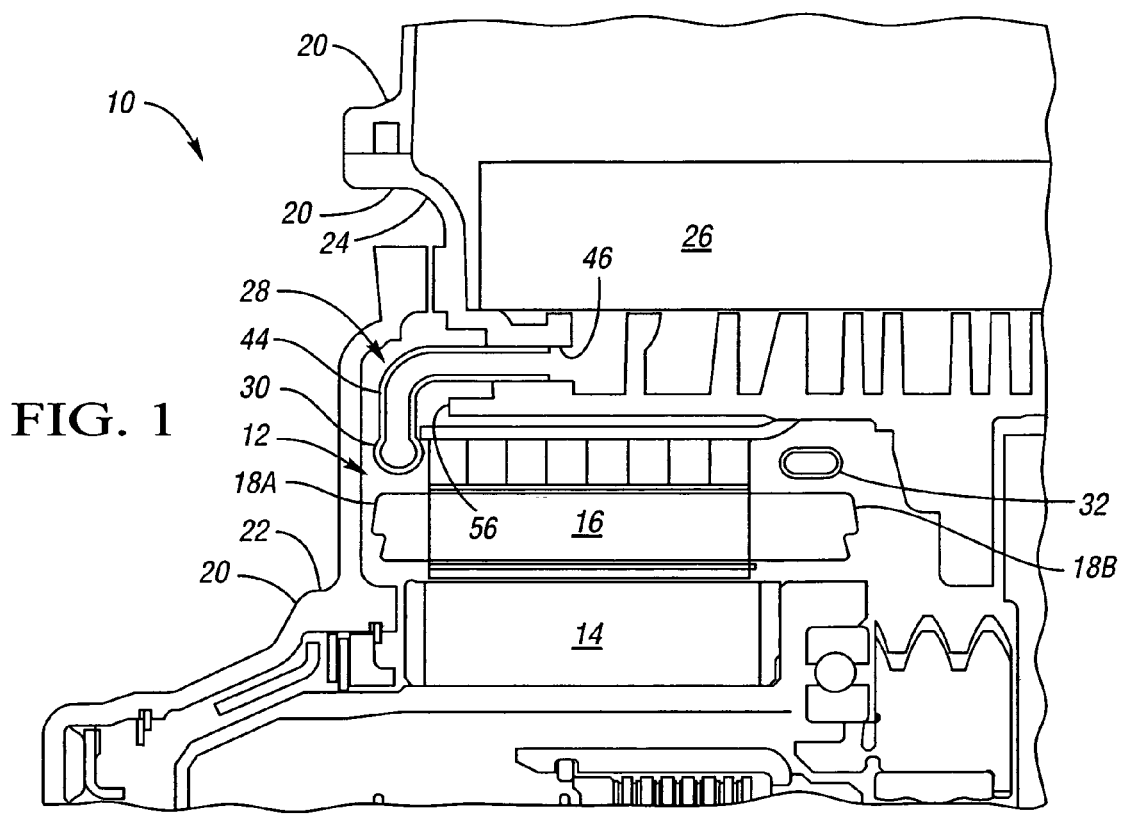
FIG. 1 is a schematic cross-sectional illustration in partial fragmentary view of a hybrid electro-mechanical transmission including a stator cooling system of the present invention supported at a transmission casing.

Referring to the drawings, wherein like reference numbers refer to like components, a hybrid electro-mechanical transmission 10 has a motor/generator 12 that includes a rotatable rotor 14 and a stationary stator 16. As will be readily understood by those skilled in the art, the rotor 14 and stator 16 are annular, with the rotor 14 rotating about a center line of the transmission (not shown). The stator 16 includes stator windings 18A and 18B. Rotation of the rotor 14 produces electrical current within the stator windings 18A, 18B when the motor/generator 12 acts as a generator; alternatively, when the motor/generator 12 acts as a motor, electrical energy from a power source such as a battery (not shown) flows through the stator windings 18A, 18B for powering the rotor 14. The motor/generator 12 is housed within a transmission casing 20 that may include several components such as an end cover 22 and a casing portion 24 that contains a hydraulic valve body 26 controllable by a control unit (not shown) for selectively delivering fluid to the transmission 10 for cooling and lubrication thereof.

Figure 2:
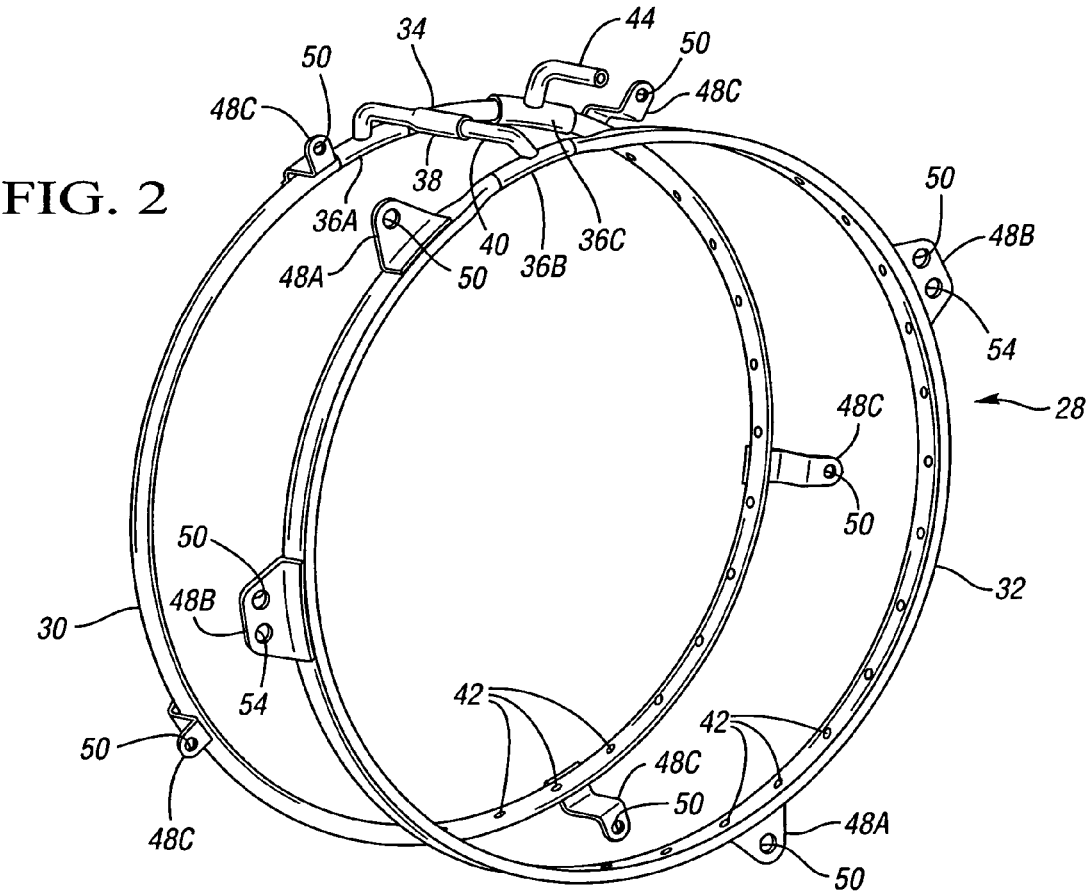
FIG. 2 is a schematic perspective illustration of the stator cooling system of FIG. 1.

A first embodiment of a cooling system 28 for cooling the annular stator 16 and particularly the stator windings 18A, 18B is illustrated in FIGS. 1 and 2. The transmission 10 may include a second motor/generator, in which case a second cooling system 28 may be used to cool the stator of the second motor/generator. Referring to FIG. 2, a first curved tube 30 and a second curved tube 32 are connected via a connector tube 34 that interfaces with the tubes 30, 32 with T-joints 36A, 36B. The connector tube 34 has a first portion 38 extending from T-joint 36A which interfits with a second portion 40 that extends from the T-joint 36B to establish fluid connection between the first and second tubes 30, 32. Openings (not shown) in the tubes 30, 32 interface with the respective connector tube portions 38, 40 to allow fluid flow from the first tube 30 through the connector tube 34 to the second tube 32. Each of the tubes 30, 32 is formed with or is machined with a plurality of circumferentially spaced fluid openings 42. In FIG. 2, the fluid openings 42 are viewable on a portion of the tubes 30, 32. Preferably, however, the fluid openings 42 circumscribe the tubes 30, 32 at radially inner surfaces thereof. Alternatively, the fluid openings 42 may be located only at a portion of the tubes 30, 32 located generally above the stator 16 when installed. In this case, the lower half of the stator windings 18A, 18B are cooled by fluid dripping from the top half of the stator windings. Thus, additional pump capacity is not required to force fluid from the bottom half of the tubes 30, 32 upward toward adjacent stator 16 and stator windings 18A, 18B.

An intake tube or conduit 44 is fluidly connected with the first tube 30 via another T-joint 36C. Referring again to FIG. 1, the intake tube 44 is interference fit or sealingly fit within a channel or bore 46 of the transmission casing 20 to receive cooling fluid from the valve body 26 for distribution to the first tube 30. Referring again to FIG. 2, fluid is then passed from the first tube 30 to the second tube 32 through the connector tube 34. The fluid is then distributed from the tubes 30, 32 through the fluid openings 42 onto the stator 16 and stator windings 18A, 18B. The fluid openings may be sized so that the fluid is distributed in the form of a spray. Nozzles may be inserted into the openings to control distribution of the fluid.

In the embodiment of FIGS. 1 and 2, the cooling system 28 is supported with brackets 48A, 48B, and 48C at two separate transmission casing 20 bosses located generally at two separate axial planes as described below. A "boss," as used herein, is an extension or inner surface of the casing 20 at which the cooling system 28 is supported. The cooling system 28 is assembling by piloting the second tube 32 into the transmission 10 with the end cover 22 removed and prior to installation of the motor generator 12. As shown in FIG. 2, the second tube 32 has two types of fastening brackets 48A and 48B which may be welded or otherwise secured to the tube 32. The brackets 48A each have a fastener opening 50 for receiving a bolt or other type of fastener to secure the second tube 32 to the transmission casing 20 at a first set of bosses (not shown, but located generally adjacent the second tube 32). Referring again to FIG. 2, the second tube 32 also has fastening brackets 48B that have both a fastener opening 50 and a locator opening 54.

Figure 3:
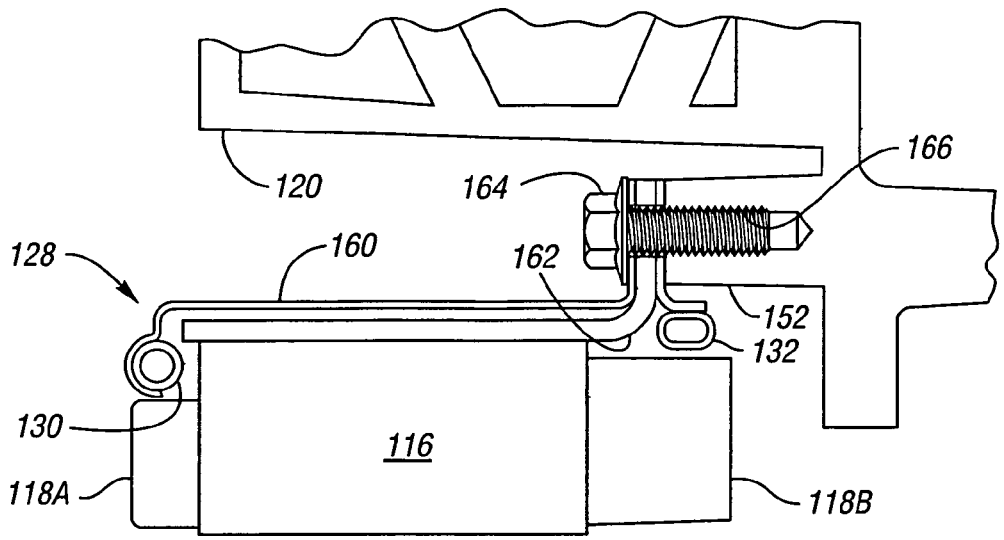
FIG. 3 is a schematic illustration in partial cross-sectional fragmentary view of a second embodiment of a stator cooling system within the scope of the present invention.

The locator opening 54 receives a dowel pin to properly align the second tube 32 radially and within the transmission 10. The dowel pin mates with a dowel pin hole formed within the casing 20 at the first set of bosses. Once located via the dowel pins, fasteners such as bolts similar to that described below with respect to FIG. 3 are inserted in the fastener openings 50 and received within complementary threaded bores within the transmission casing 20. Once the second tube 32 is so installed, the first tube 30 may be fluidly connected with the second tube 32 by mating the connector tube portion 38 with connector tube portion 40. This then properly aligns the first tube 30 within the transmission casing 20. By connecting the tube portions 38, 40, first tube brackets 48C having fastener openings 50 are thereby automatically aligned with threaded bores within a second set of bosses of the transmission casing (not shown, located generally adjacent the first tube 30) so that fasteners may be inserted to secure the first tube 30 to the transmission casing 20.

Second Exemplary Embodiment of Cooling System

Figure 4:
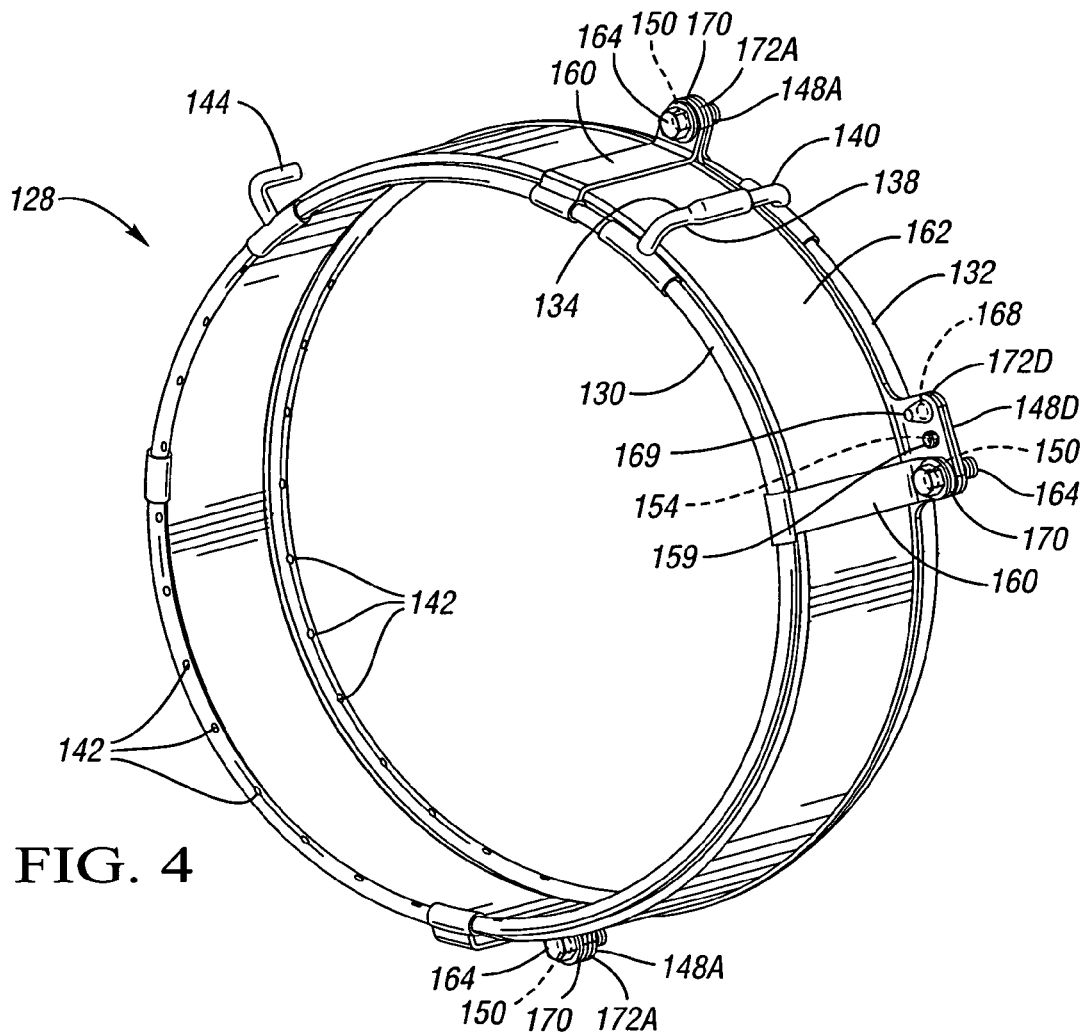
FIG. 4 is a schematic perspective illustration of the stator cooling system of FIG. 3.
Figure 5:
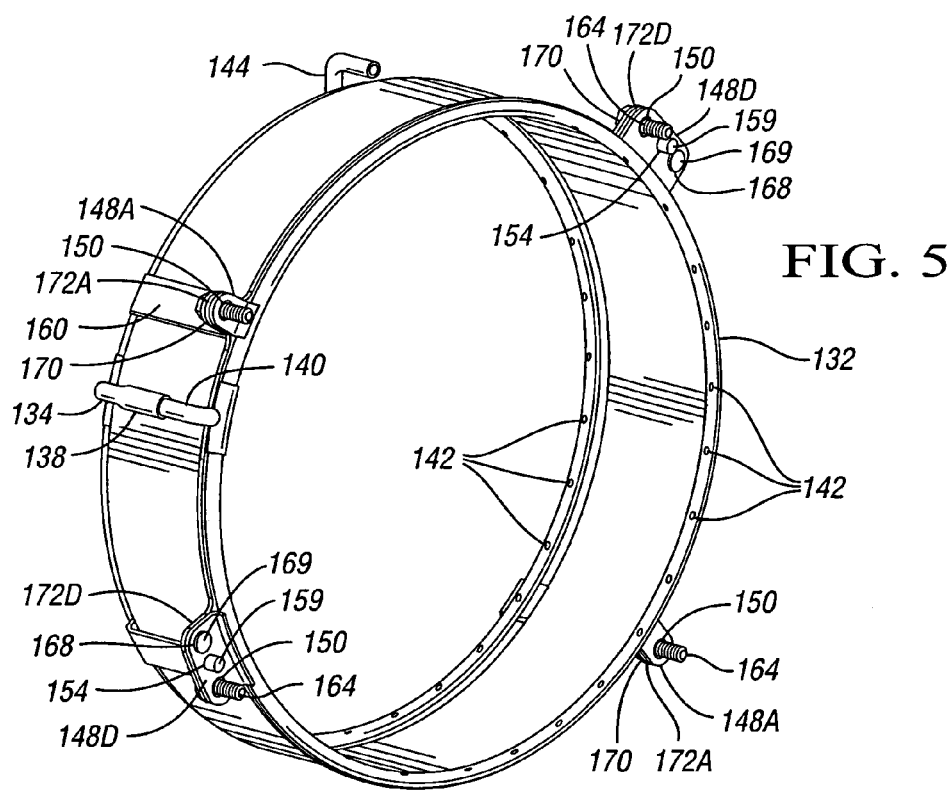
FIG. 5 is another schematic perspective illustration of the stator cooling system of FIG. 4.

Referring to FIGS. 3-5, a second embodiment of a cooling system 128 is illustrated. The cooling system 128 includes first and second tubes 130, 132 and elongated brace 160 and a stator housing 162 as will be described below with respect to FIGS. 3-5. As best shown in FIG. 3, the cooling system 128 is supported at a single plane of bosses 152 of the transmission casing 120.

Referring to FIG. 4, the cooling system 128 includes first and second tubes 130 and 132, respectively, with an intake conduit 144 extending from tube 130 and in fluid communication therewith to receive fluid from a valve body in the transmission casing 120 similarly to intake conduit 44 of FIG. 1 (the intake conduit 144 is not shown at the cross sectional location of FIG. 3). As with the first embodiment, a connector tube 134 includes a first portion 138 extending from the first tube 130 that is interference or sealingly fit with a second portion 140 extending from the second tube 132 to establish fluid communication between the first and second tubes 130, 132. The first and second tubes 132 include fluid openings 142 similar in location and function to fluid openings 42 of the first embodiment. The second tube 132 includes two types of tube brackets 148A and 148D which are secured thereto by welding other means of securement and are best viewed in FIG. 5. The tube brackets 148A have a fastener opening 150 for receiving a threaded fastener 164 to mate with a threaded bore 166 formed within the transmission casing 120 (best shown in FIG. 3). The second tube 132 also includes tube brackets 148D, each of which has three openings including a fastener opening 150, a locator opening or dowel pin opening 154 to receive a dowel pin 159 as well as an assembly pin opening 168 to receive an assembly pin 169.

The elongated brace 160 is secured to the first tube by welding or other means and includes a brace bracket 170 extending generally radially outward therefrom. The brace bracket 170 has a fastener opening 150 to receive a threaded fastener 164. As best shown in FIG. 4, the stator housing 162 is also formed with radially extending stator housing brackets 172D that have assembly pin openings 168, locator openings 154 and fastener openings 150 generally alignable with those corresponding openings in the tube bracket 148D of the second tube 132. The stator housing 162 also has radially-extending brackets 172A (shown sandwiched between tube brackets 148A and brace brackets 170) having fastener openings 150 alignable with fastener openings 150 in tube brackets 148A and brace brackets 170.

Accordingly, to assemble the cooling system 128, the second tube 132 is mated with the stator housing 162 by aligning assembly pins 169 extending through assembly pin openings 168 in both the second tube brackets 148D and stator housing brackets 172. The thus preassembled second tube 132 and stator housing 162 with a stator attached thereto are then piloted radially within the transmission casing 120 by dowel pins 159 extending through locator openings 154 in both the stator housing bracket 172 and the tube bracket 148D until the dowel pins 159 are mated with receiving openings (not shown) in the transmission casing 120 to properly align the tube 132 and stator housing 162 for receiving threaded fasteners 164 through the locator openings 150 in the brackets 172, 148D. Prior to inserting the threaded fasteners 164, however, the first tube 130 is piloted axially inward toward the assembled second tube 132 and stator housing 162 so that the first portion 138 of connector tube 134 mates with the second portion 140, the fastener openings 150 within the brace brackets 170 align with fastener openings 150 in the stator housing bracket 172 and those in the tube bracket 148D. Other of the elongated braces 160 are automatically aligned with fastener openings in the brackets 148A so that threaded fasteners 164 may be inserted through the aligned fastener openings 150. As is evident from FIGS. 3 through 5, the brackets 170, 172, 148A and 148D are axially aligned with the set of bosses 152 in a single plane so that the threaded fasteners 164 may support the cooling system 128 at the bosses 152 of FIG. 3.

Third Exemplary Embodiment of a Cooling System

Figure 6:
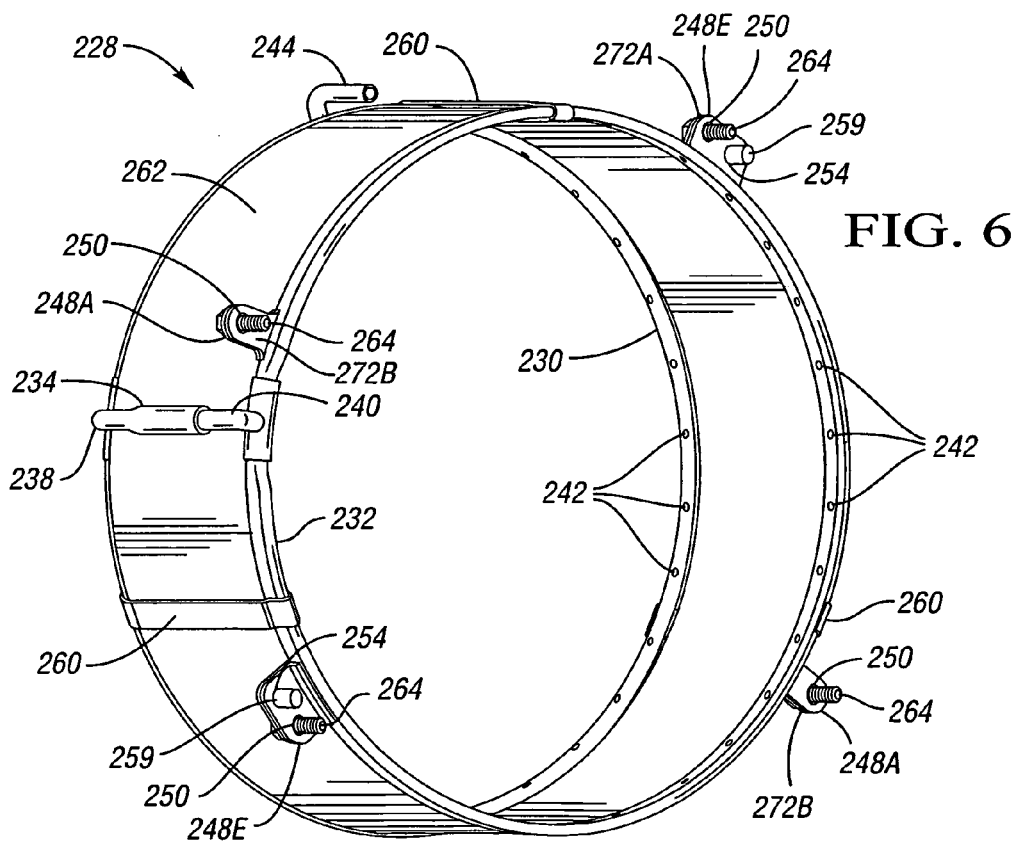
FIG. 6 is a schematic perspective illustration of a third embodiment of a stator cooling system within the scope of the present invention.
Figure 7:
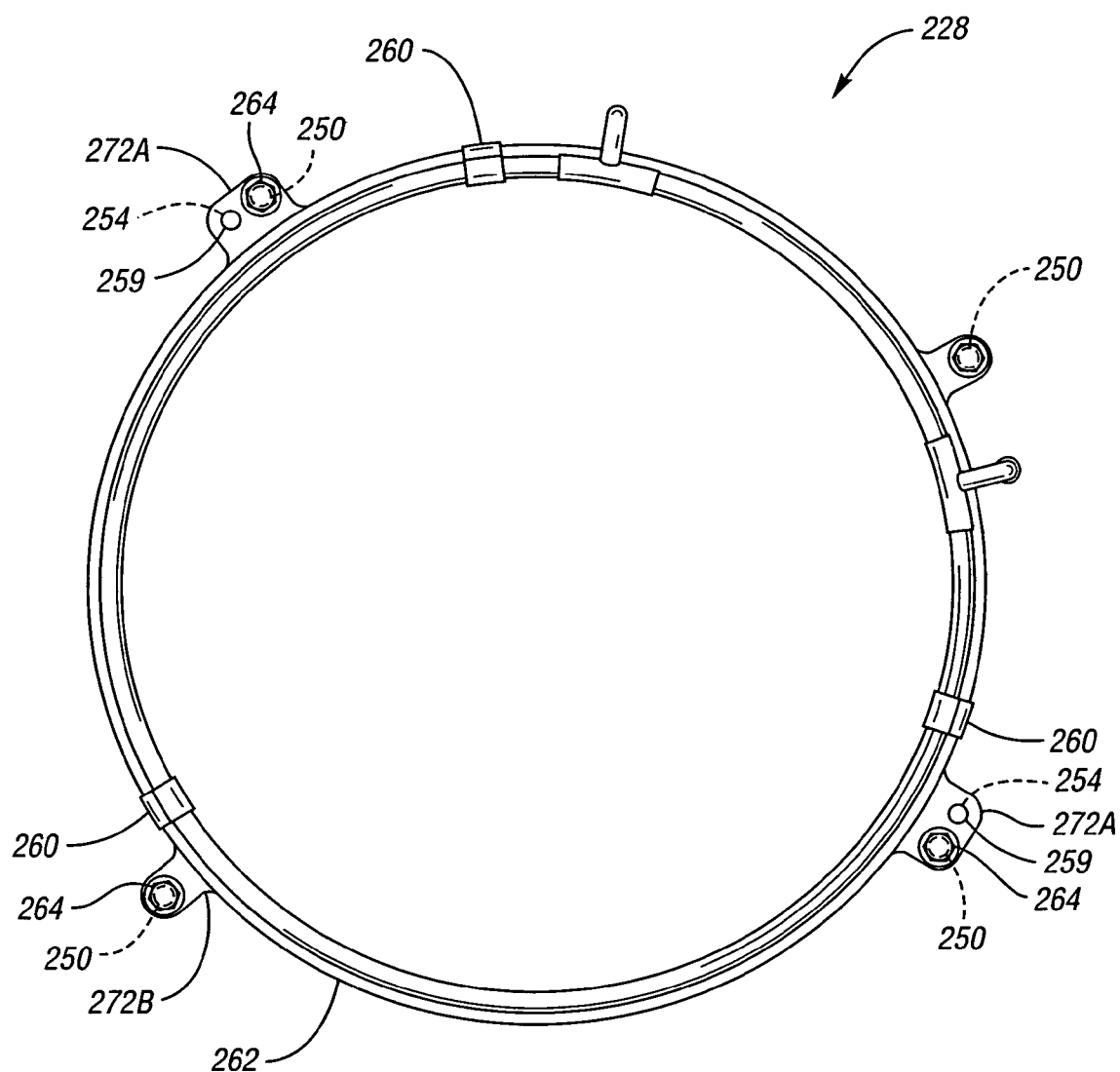
FIG. 7 is an end view schematic illustration of the stator cooling system of FIG. 6.

Referring to FIGS. 6 and 7, a third embodiment of a cooling system 228 is illustrated. First and second curved tubes 230, 232, respectively, have stator housing 262 disposed therebetween. The first tube 230 has an intake conduit 244 extending therefrom similarly to intake conduit 44 of the first embodiment of FIGS. 1-2. Connector tube 234 has a first portion 238 extending from the first tube 230 that fits or mates with a second portion 240 extending from the second tube 232 to allow fluid communication between the tubes 230, 232. The tubes 230, 232 have fluid openings 242 similar in location and further to fluid openings 42 of the first embodiment. In this embodiment, elongated braces 260 are secured to the first tube 230 by welding or other rigid securement means. The braces 260 may, but need not be welded to the first tube 230; the braces 260 may be retained to the first tube 230 by the same spring action that secures the tubes 230, 232 against the stator housing 262. Each elongated brace 260 is pretensioned so that it may be fit over the second tube 232 to secure the second tube 232 with respect to the first tube 230. Notably, the elongated braces 260 do not include a brace bracket and are not directly connectable with the fastener to a transmission casing. The second tube 232 has tube brackets 248A welded or otherwise secured thereto. The tube brackets 248A are formed with fastener openings 250. Additionally, the second tube 232 has tube brackets 248E which have a locator opening 254 as well as fastener opening 250.

As may be best viewed in FIG. 7, the stator housing 262 includes stator housing brackets 272A and 272B. Stator housing brackets 272A include fastener openings 250 and locator openings 254. Each stator housing brackets 272B includes only a fastener opening 250. Preferably, there are two of each type of stator housing bracket 272A, 272B arranged circumferentially about the stator housing 262. To assemble the cooling system 228 within a transmission casing such as transmission casing 120 of FIG. 3, the locator openings 254 in the tube brackets 248E are aligned with the locator openings 254 in the stator housing brackets 272A. Then the first tube 230 is attached to the aligned stator housing 262 and second tube 232 by coupling the connector tube portions 230A and 240 and slipping the pretensioned elongated braces 260 over the second tube 232. The entire assembly may now be piloted axially inward into the transmission casing 20 with dowel pins 259 through the locator openings 254. Fasteners 264 may then be inserted through the fastener openings 250 in the brackets 248A, 248E and 272A and 272B through respective aligned holes 250 into a threaded bore within a transmission casing to support the entire cooling system 228 at the single set of bosses.

While the best modes for carrying out the invention have been described in detail, those familiar with the art to which this invention relates will recognize various alternative designs and embodiments for practicing the invention within the scope of the appended claims.

The invention claimed is:

1. A cooling system for an annular stator housed within a transmission casing, comprising:
 a first curved tube sufficiently sized to at least partially circumscribe the stator when said tube is placed within the transmission casing, said tube having a plurality of circumferentially-spaced fluid openings; and
 an intake conduit connected to said tube operable for delivering cooling fluid from the transmission casing to said tube for flow through said fluid openings to cool the stator.

2. The cooling system of claim 1, further comprising:
a second curved tube sufficiently sized to at least partially circumscribe the stator and having a plurality of circumferentially-spaced fluid openings; and
a connector tube connectable between said first and second tubes for establishing fluid connection therebetween, said first and second tubes being axially spaced from each other when connected by said connector tube;
said fluid openings in said second tube being operable for delivering cooling fluid provided through said connector tube to said stator for further cooling thereof.

3. The cooling system of claim 2, wherein at least one of said first and second tubes has a fastening bracket with a fastener opening therein for receiving a fastener to secure said tube to the transmission casing.

4. The cooling system of claim 3, wherein said fastening bracket also has a locator opening therein for aligning said fastening bracket with the transmission casing via a locator.

5. The cooling system of claim 4, further comprising:
an annular stator housing for at least partially supporting said stator, said stator housing having a stator housing bracket with an assembly pin opening therein;
wherein said fastening bracket also has an assembly pin opening therein, said respective assembly pin openings being alignable for receiving an assembly pin therethrough to preassemble said at least one of said first and second tubes and said stator housing.

6. The cooling system of claim 2, further comprising:
an elongated brace sufficiently sized to span between said first and second tubes when said first and second tubes are connected by said connector tube.

7. The cooling system of claim 6, wherein said elongated brace is secured to said first tube and extends generally axially therefrom for operative connection to said second tube.

8. The cooling system of claim 6, further comprising:
an annular stator housing for at least partially supporting the stator, said stator housing being positioned between said first and second tubes, wherein said elongated brace spans said stator housing.

9. The cooling system of claim 8, wherein said second tube has a fastening bracket with a fastener opening therein; wherein said stator housing has a stator housing bracket with a fastener opening therein; wherein said elongated brace has a brace bracket with a fastener opening therein, said respective fastener openings being alignable for receiving a fastener to secure said first and second tubes and said stator housing to the transmission casing.

10. A cooling system for an annular stator housed within a transmission casing, comprising:
a first and a second curved tube, each sufficiently sized to at least partially circumscribe the stator when the tube is placed within the transmission casing and each having a plurality of circumferentially-spaced fluid openings;
a stator housing for at least partially supporting the stator, wherein said stator housing is positioned axially between said first and second tubes;
an intake conduit connected to said first tube and operable for delivering cooling fluid from the transmission casing to said first tube for flow through said fluid openings of the first tube to thereby cool the stator; and
a connector tube connectable between said first and second tubes for establishing fluid connection therebetween, said first and second tubes being axially spaced from each other when connected by said connector tube, said fluid openings in said second tube being operable for delivering cooling fluid provided from said first tube through said connector tube to the stator for further cooling thereof.

11. The cooling system of claim 10, wherein said second tube has a fastening bracket with a fastener opening therein for receiving a fastener to secure said second tube to the transmission casing.

12. The cooling system of claim 11, wherein said fastening bracket also has a locator opening therein for aligning said fastening bracket with the transmission casing via a locator.

13. The cooling system of claim 11, further comprising:
an elongated brace sufficiently sized to span between said first and second tubes when said first and second tubes are connected by said connector tube.

14. The cooling system of claim 13, wherein said elongated brace is secured to said first tube, extends generally axially therefrom and is of sufficient length to span said stator housing.

15. The cooling system of claim 13, wherein said second tube has a fastening bracket with a fastener opening therein; wherein said stator housing has a stator housing bracket with a fastener opening therein; wherein said elongated brace has a brace bracket with a fastener opening therein; said respective fastener openings being alignable for receiving a fastener to secure said first and second tubes and said stator housing to the transmission casing.

16. A method of assembling a cooling system for an annular stator housable within a transmission casing and at least partially supportable by an annular stator housing, comprising:
providing first and second curved tubes;
aligning the second curved tube substantially concentrically with the stator housing at one side thereof;
aligning the first curved tube substantially concentrically with the stator housing at an opposing side thereof to thereby establish fluid connection between the first and second curved tubes; and
fastening the aligned tubes and stator housing to the transmission casing.

17. The method of claim 16, wherein said aligning the second curved tube step includes aligning fastener openings in respective brackets of the second curved tube and the stator housing.

18. The method of claim 17, wherein said aligning the first curved tube step includes, after said aligning the second curved tube step, aligning fastener openings in brackets of the first curved tube with the aligned fastener openings of the second curved tube and the stator housing.

19. The method of claim 16, wherein said aligning the first curved tube step includes securing said first curved tube to said second curved tube via spring tension.

* * * * *